May 8, 1951 R. LEWTON 2,551,749
HYDRAULIC SHOCK ABSORBER WITH BAFFLE MEANS
Filed Aug. 29, 1947
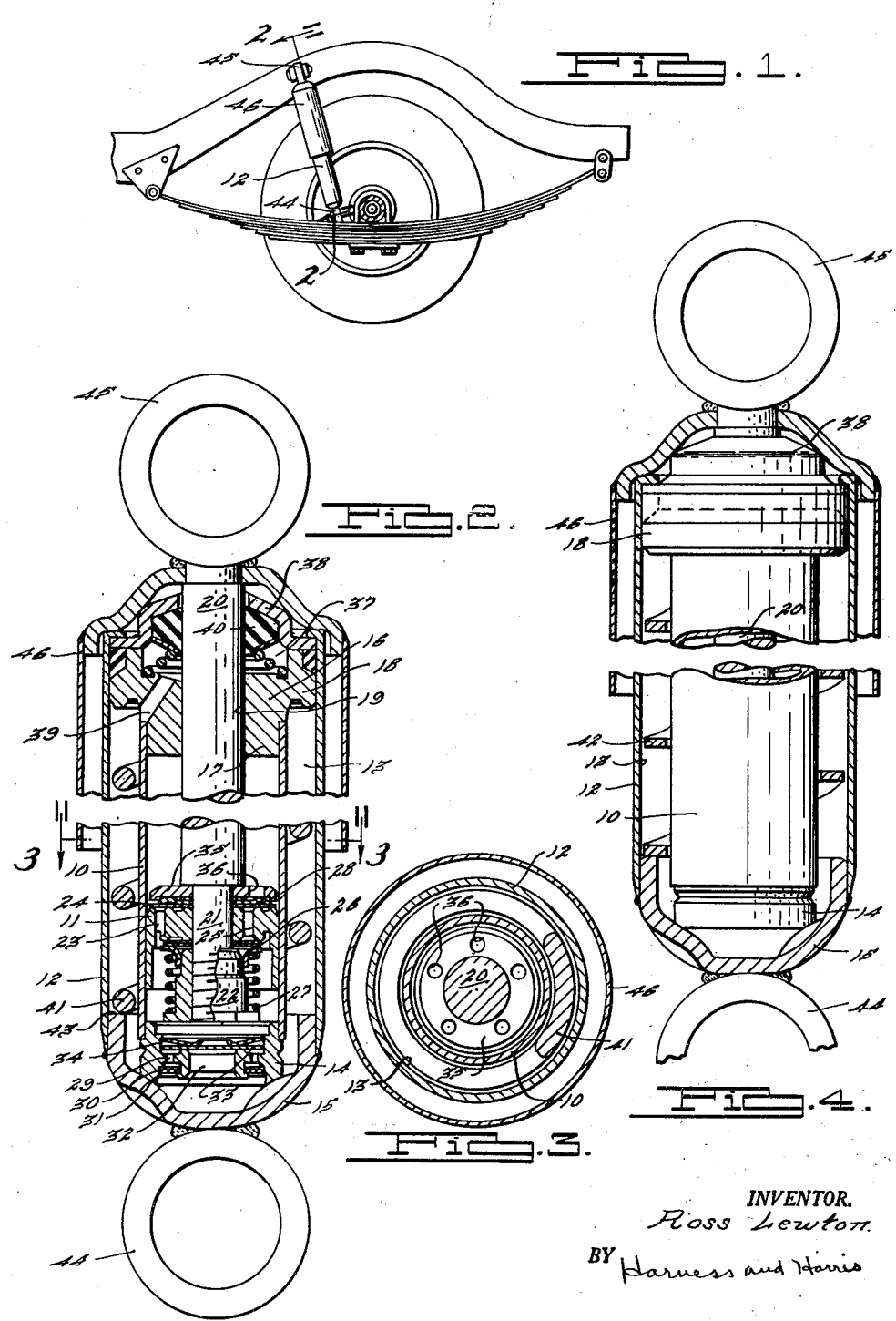
INVENTOR.
Ross Lewton.
BY Harness and Harris
ATTORNEYS.

Patented May 8, 1951

2,551,749

UNITED STATES PATENT OFFICE 2,551,749

HYDRAULIC SHOCK ABSORBER WITH BAFFLE MEANS

Ross Lewton, Highland Park, Mich., assignor to Chrysler Corporation, Highland Park, Mich., a corporation of Delaware Application August 29, 1947, Serial No. 771,213

3 Claims. (Cl. 188—88)

This invention relates to an improvement in hydraulic shock absorber mechanism.

It has been discovered that in the normal operation of a shock absorber, the liquid in the reservoir section has been churned or mixed with the air in the upper portion of the reservoir section due to the vertical motion of the whole mechanism. The presence of a mixture of air and liquid causes the action of the shock absorber to be irregular for the mixture is compressible, whereas the liquid alone is not.

The purpose of my invention is to eliminate this undesirable aeration of the liquid medium of hydraulic shock absorbers.

The principal object of my invention is to provide a hydraulic shock absorber mechanism with means to prevent mixture of the air in the upper portion of the reservoir section with the hydraulic medium in the lower portion of the reservoir section.

Another object of my invention is to provide a hydraulic shock absorber mechanism with means for retarding vertical movement and agitation of the hydraulic medium in the reservoir section which tends to occur during vertical movement and vibration of the shock absorber.

A further object of my invention is to provide means for preventing the hydraulic medium of a shock absorber, which is supplied to the cylinder thereof from being mixed with air in such a manner as to make said hydraulic medium compressible.

Another object of my invention is to provide means for retarding the surging motion of the hydraulic medium in the reservoir section without significantly obstructing the passage between said reservoir section and the cylinder section.

Another object of my invention is to provide a very inexpensive means for preventing aeration of the hydraulic medium in the reservoir section of a shock absorber.

Still another object of my invention is to provide means for retarding the surging motion of hydraulic medium in the reservoir section at a plurality of locations throughout its length.

Another object of my invention is to provide means for retarding the motion and reducing agitation of hydraulic medium in the reservoir section which provides a clearance space along the walls of the reservoir for allowing the passage of the hydraulic medium back to the lower portion of the reservoir from which it may freely flow to the cylinder part of the shock absorber.

Other objects and advantages of my invention will become more apparent from the following description taken in connection with the accompanying drawings, wherein:

Fig. 1 is a fragmentary side elevational view of a vehicle wheel suspension having a shock absorber embodying the invention.

Fig. 2 is a longitudinal sectional view of the shock absorber taken on line 2—2 of Fig. 1.

Fig. 3 is a transverse sectional view of the shock absorber mechanism taken on line 3—3 of Fig. 2.

Fig. 4 is a longitudinal sectional view similar to Fig. 2 but showing shock absorber mechanism embodying a modification of my invention.

Fig. 1 merely illustrates the position of a shock absorber mechanism with relation to the wheel suspension of a motor vehicle which in and of itself is not necessary to the forthcoming description.

The shock absorber illustrated in Fig. 2 is a hydraulic shock absorber having a cylindrical member 10 in which a reciprocating piston 11 is operable and a reservoir tube 12 concentrically disposed around the cylindrical member and spaced therefrom to provide a reservoir 13.

The cylindrical member 10 is connected at its lower end with a valve body 14 which forms the lower end wall of the cylindrical member. The reservoir tube 12 is provided at its lower end with a cap 15 which forms the lower end wall of the reservoir. Fitted in the opposite ends of the cylindrical member 10 and tube 12 are concentric offset portions 17 and 18 of a closure plug generally designated 16 which form the upper wall or end of the cylindrical member and reservoir, respectively. The plug 16 is provided with an aperture 19 in which a piston actuating rod 20 is slidably received. The inner end of the rod 20 is provided with a reduced portion 21 on which the piston 11 is mounted and retained by means of a nut 22.

The piston 11 has a passage 23 and a valve plate 24 seated over the upper end of the passage 23 which accommodates the flow of medium through the piston 11 to the space above the piston. The piston 11 also has a passage 25 and a valve plate 26 seated over the lower end of the passage 25 which allows the flow of medium through the piston into the space below the piston. A spring 27 is slidable with the piston 11 and acts to hold the valve plate 26 on its seat over the passage 25. A flat spring 28 acts in a similar fashion to urge the plate 24 to its seat over the passage 23.

A piston cap 35 is positioned between the piston 11 and the shoulder of the rod 20 and has disposed therein a plurality of orifices 36 to facilitate the flow of medium from the space above the piston into the passage 25.

The valve body 14 has disposed therein a plurality of outlet passages 29. A valve unit comprising plates 30 is arranged to cover the lower ends of the passages 29 and a flat spring 31 urges the plates to seat them over the ends of the passages 29. This valve unit opens under pressure of the fluid below the piston to allow the flow of medium through the valve body 14 to the reservoir 13. A passage 32 having a valve plate 33 seated over its upper end is provided in the valve body 14. A flat spring 34 urges the plate 33 to its closed position. The valve plate 33 is opened by pressure differential when the piston 11 moves upwardly as viewed in Fig. 2 to facilitate the flow or medium through the valve body to the space below the piston.

A chamber 37 is located directly above closure plug 16 and has as upper wall a sealing cap 38, the cap 38 having a centrally located opening to allow the passage of the rod through it.

During operation of the shock absorber, medium sometimes escapes upwardly through aperture 19 into chamber 37. A passage 39, therefore, is disposed within closure plug 16 to allow for the return of the hydraulic medium to the reservoir 13. A washer-like sealing element 40 is disposed within the chamber 37 to prevent any further upward motion of the hydraulic medium.

Lower ring 44 is welded to the cap 15 and acts as a means for securing the lower end of the shock absorber to a motor vehicle. Upper ring 45 is secured to the rod 20 and may be used to attach the upper end of the absorber to a motor vehicle. A cylindrical guard means 46 is attached to the rod 20 and acts as a shield for the rod when the shock absorber is in its extended position.

When the piston is moving upwardly, the hydraulic medium in the space above the piston flows downwardly through the orifice 36, passage 25, unseats valve 26 and flows into the space below the piston. Since there is not enough medium in the space above the piston to fill the space below the piston when this motion of the piston is completed, medium from the reservoir flows through the passage 32, unseats the valve 34 in the valve body and flows into the space below the piston to completely fill it. When the piston moves downwardly, the medium in the space below the piston flows through the passage 23, unseats the valve 24 in the piston 11 and flows into the space above the piston. Since there is more medium in the space below the piston than needed to fill the space above the piston, the remaining hydraulic medium is forced through passage 29, unseats the valve 30 in the valve body 14 and flows back to the reservoir.

As hereinbefore shown, the medium in the reservoir is constantly flowing into the cylinder 10 and back during the operation of the shock absorber. The medium in the reservoir is also urged upwardly by the vertical motion and vibration of the motor vehicle to which the absorber is attached. When this happens the medium in the reservoir mixes with the air above it and takes on a foamy nature. The effect of this mixture in the cylinder is undesirable because the mixture is compressible thereby allowing the piston in the chamber to move too rapidly.

To greatly retard the motion of the hydraulic medium in the reservoir, I have provided a helical baffle 41 which may be disposed within the reservoir 13. The baffle 41 may be fashioned out of any suitable rigid material and need not be of a compressible nature. The material used, to be arranged in the form of a helix to make the baffle 41 may be of any suitable cross section preferably of a circular or rectangular type. The circular type is pictured as baffle 41 in Fig. 2. The rectangular type is shown as baffle 42 in Fig. 4.

The baffle 41 may be loosely positioned within the reservoir 13 and has its lower extremity open to allow the medium to pass freely from the central portion of the reservoir to the bottom of the reservoir. The innermost extremity of the cap 15 forms a shoulder 43 which stops the lower extremity of the helical baffle 41 from extending into the bottom portion of the reservoir. The cross sectional dimension of the baffle is shown to be slightly less than the distance between the walls of the reservoir to allow the return of medium in the upper portion of the reservoir to the lower portion between the baffle 41 and walls of the reservoir. If desired, the baffle 41 may be formed to completely span the space between the walls of the reservoir and the spiral path formed between the turns of the baffle may be solely relied upon to conduct the medium from the upper to the lower end portions of the reservoir.

The baffle herein disclosed will not entirely stop all vertical motion of the medium in the reservoir. Each turn of the helical baffle does act, however, to retard this motion. The medium that does upwardly pass the baffle will, due to the contour of the baffle, travel to the upper portion of the reservoir in a substantially spiral path.

Although but several specific embodiments of the invention are herein shown and described, it will be understood that various changes in the sequence of operations, steps and materials employed may be made without departing from the spirit of the invention.

I claim:

1. A hydraulic shock absorber including piston and cylinder portions, means providing a hydraulic medium reservoir of ring-shaped cross sectional configuration concentrically about said piston and cylinder portions, and a helical baffle extending throughout the major portion of the length of said reservoir, encircling said cylinder and spaced from at least one wall of said reservoir for accommodating flow of only a limited portion of said medium directly axially of said reservoir, said baffle having a plurality of successively adjacent turns providing a series of abutments inclined relative to the axis of said reservoir for opposing surging of the remaining portion of said medium directly axially of said reservoir while accommodating spiral movement of said major portion of said medium to gradually dissipate vibration promoted surge thereof.

2. The structure set forth in claim 1 wherein the helical abutment is of circular cross sectional configuration.

3. The structure set forth in claim 1 wherein the helical baffle is of rectangular cross sectional configuration.

ROSS LEWTON.

REFERENCES CITED

The following references are of record in the file of this patent:

UNITED STATES PATENTS

| Number | Name | Date |
| --- | --- | --- |
| 1,628,900 | Neilsen | May 17, 1927 |
| 2,138,513 | Rossman et al. | Nov. 29, 1938 |
| 2,163,254 | Binder et al. | June 20, 1939 |
| 2,410,992 | Myklestad | Nov. 12, 1946 |